FIG. I.
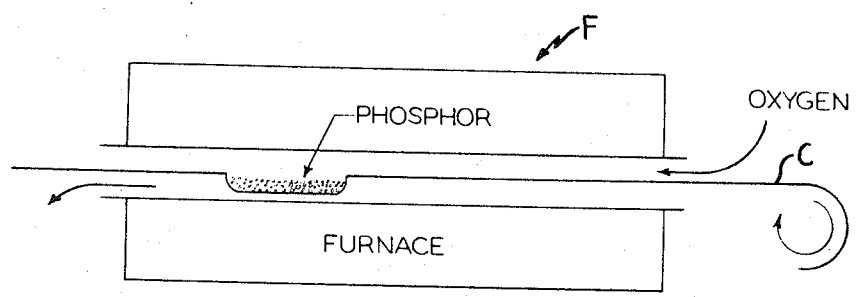
FIG. 2.
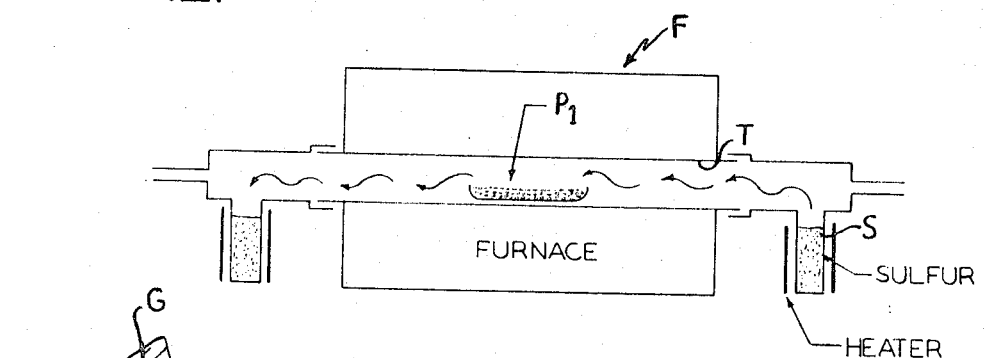
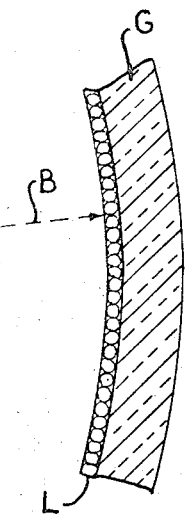
FIG. 5.

United States Patent Office 3,449,148
Patented June 10, 1969

3,449,148
FORMATION OF ELECTRON BARRIERS ON PHOSPHOR PARTICLES
Samuel Ray Shortes, Dallas, Tex., assignor to Texas Instruments Incorporated, Dallas, Tex., a corporation of Delaware
Continuation-in-part of application Ser. No. 459,582, May 28, 1965. This application June 30, 1966, Ser. No. 561,815
Int. Cl. C09k 1/36
U.S. Cl. 117—33.5      6 Claims

ABSTRACT OF THE DISCLOSURE

This specification discloses a method of forming electron barriers on phosphor particles to make them responsive to electrons of a given energy level, characterized by reacting a material, such as oxygen, in gaseous phase with the phosphor particles to destroy the luminescent centers in the phosphor crystal structure adjacent the surface and create a barrier layer with large number of trapping centers such as electrons having an energy too low to penetrate the barrier do not excite the phosphor. In a specific aspect wherein zinc sulfide phosphor has a layer of oxidized zinc therearound the zinc oxide is reconverted to zinc sulfide for greater purity of color emission by reacting the zinc oxide with a sulfur-containing material. The zinc sulfide which is restored to the surface area is non-luminescent and contains a large number of trapping centers, just as the zinc oxide did.

---

This application is a continuation-in-part of my copending U.S. patent application Ser. No. 459,582, filed May 28, 1965, for Phosphors now Patent No. 3,408,223, for Color Display Systems.

This invention relates to phosphors for color display systems and more particularly to such phosphors which have increased electron energization thresholds and to methods for making such phosphors.

Among the several objects of this invention may be noted the provision of phosphors for use in making viewing screens for color display systems in which image colors are controlled by varying the energy lever or velocity of an electron beam; the provision of simple, economical and reliable methods of making such phosphors; the provision of such methods by which are formed on phosphor particles electron retarding surface barriers which are relatively independent of the size of the phosphor particles and the distribution of size thereof; and the provision of methods of the class described in which phosphor particles of different color light-emitting properties may be provided with closely controlled electron energization thresholds and which do not require exceptionally high voltage differentials for excitation thereof. Other objects and features will be in part apparent and in part pointed out hereinafter.

Briefly, this invention is directed to increasing the electron energization threshold of phosphor particles by heating said particles to an elevated temperature and exposing them to an atmosphere of a material which reacts in vapor phase with the phosphor particle to effect an in situ surface chemical reaction on the phosphor particle surfaces to form a surface barrier layer. Preferably the phosphor particles are zinc sulfide containing phosphors, such as zinc sulfide-cadmium sulfide (silver activated), and the vapor phase reactant material is oxygen, the resulting surface barrier layer thereby formed being essentially zinc oxide. It is desirable in certain instances to further react the surface barrier layer with a second material in vapor phase, such as sulfur or hydrogen sulfide, again at an elevated temperature, to form in situ a sulfide-containing barrier layer. Also encompassed by this invention are viewing screens for color display systems which include particles of a first phosphor which emit light of a first color when excited by a beam of electrons having a velocity of at least a first predetermined value, and particles of a second phosphor having a surface layer which constitutes a partial barrier to electrons whereby the second phosphor particles have a higher electron energization threshold than that of said first phosphor particles. The surface layers of these second phosphor particles comprise a compound formed in situ on the particle surface by chemical reaction of the second phosphor particle material with a compound in vapor phase and these second phosphor particles therefore emit a second color light when excited by a beam of electrons having a velocity of at least a second predetermined value which is greater than said first value.

The invention accordingly comprises the products and methods hereinafter described, the scope of the invention being indicated in the following claims.

In the accompanying drawings, in which several of possible embodiments of the invention are illustrated:

FIGURE 1 illustrates apparatus for carrying out a method of the present invention for increasing the electron energization threshold of phosphor particles;

FIGURE 2 illustrates similar apparatus for carrying out a second optional step in the methods of this invention;

FIGURE 5 illustrates a portion of a viewing screen of a color display system employing phosphor particles having increased energization thresholds.

Corresponding reference characters indicate corresponding parts through the several views of the drawings.

Figure 3:
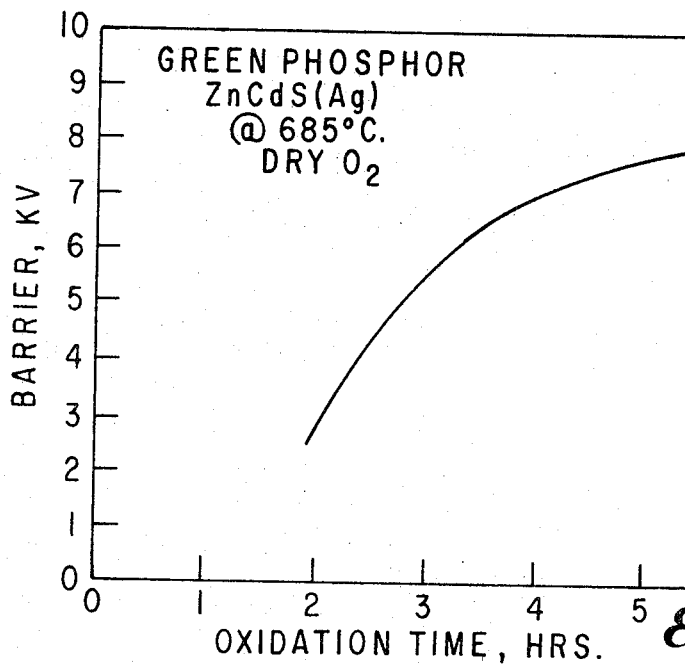
FIGURES 3 and 4 are graphical representations illustrating the increased electron energization threshold values of colored phosphor particles as effected by methods of this invention.

In recently developed color display systems, electron viewing screens are employed which include phosphor particles of different color light-emitting characteristics and which are respectively differently responsive to electrons of differing energies or velocities. In such systems, the viewing screen includes a first phosphor (e.g., one which emits light of relatively long wavelengths such as red) which is energized to emit light when struck by electrons having at least a first predetermined velocity or beam energy level, for example, accelerated by a kinescope accelerating voltage of perhaps 10 kv., this being the operating voltage for the red phosphor, although the phosphor turns on or begins to emit light at much lower voltages. The viewing screen also includes particles of a second phosphor, e.g., one which emits a substantial level of a second color light of shorter wavelengths, and preferably complementary in color to that of the first phosphor (such as a cyan colored light), when energized by electrons having at least a second and higher predetermined velocity, e.g., 15 kv., this being the operating voltage for the second phosphor. That is, while the second phosphor begins to emit a light at a lower voltage, perhaps at 10 kv., a substantially higher voltage is used to achieve the required light level. If a beam of electrons of the lower velocity, 10 kv., is current modulated in accordance with the red record represented by the red color information signal derived in the receiver of any conventional color television receiver (such as those operating in accordance with the NTSC, SECAM or PAL systems), a red color image corresponding to the red record is presented on the viewing screen of the kinescope. At electron velocities of 10 kv., the second or cyan light-emitting phosphor will not be significantly energized to emit light, although it may be just turning on. By current modulating a beam of electrons having a beam energy of 15 kv. with the green record represented by the receiver's green color information signal, both the first and second phosphors will be concurrently energized to produce a white or substantially achromatic light. Thus red and white images are produced on the viewing screen either continuously or alternately, by two electron beams moving in registry in a raster scanning pattern across the viewing screen. These images combine to form a composite image which subjectively appears to include a full range of hues including those which are not actually present in a colorimetric sense. Such a two color system of presenting full color images is known in the art and provides images of pleasing appearance in which the hues appear more saturated than would be expected. Such a system is described in further detail in the copending and coassigned application Ser. No. 452,299, filed Apr. 30, 1965, now Patent No. 3,371,153.

To obtain an even more desirable color display, a viewing screen is employed which also includes particles of a third phosphor having a higher beam energy threshold. e.g., one which emits a substantial level of light of a third color (e.g., blue) when energized by electrons having a higher velocity, e.g., 20 kv. As above, the third phosphor may begin to turn on at a lower voltage, perhaps at 15 kv., but much higher voltages are needed for an operating light level. A beam of such an energy level modulated in accordance with the blue record represented by the blue color information signal of the television receiver, will energize all three phosphors and produce a third image of cooler achromatic light, and provide a composite image of particular pleasing color. A more detailed description of such systems may be found in the copending and coassigned application Ser. No. 450,705, filed Apr. 26, 1965, now abandoned.

It will be noted in the preceding example that the second phosphor may be considered to have a "barrier" of 10 kv., while the third phosphor has a barrier of 15 kv., as these terms will be subsequently used.

In the aforesaid application Ser. No. 459,582, the methods more particularly described individually coating the particles by physical deposition of a vapor phase material on the surfaces of the phosphor particles. This provides an effective electron retarding barrier layer, but the methods and viewing screen phosphors of this invention have significant advantages over such physical deposition methods and the phosphors thus formed in that the present methods are much simpler to carry out and may be controlled more easily to provide barrier layers of more precise characteristics and properties. Thus the present invention is directed to improved methods for forming phosphors which are differently responsive to electrons of different velocities (and thus are particularly useful in the above discussed color display systems), and also to novel viewing screens incorporating such phosphors.

Referring now more particularly to the drawings, a furnace F is diagrammatically illustrated in FIGURE 1, together with a carrier C for moving a body of phosphor particles through the furnace. The phosphor particles are heated to an elevated temperature and exposed to an atmosphere of a material such as oxygen which reacts in vapor phase with the phosphor particles to effect an in situ surface chemical reaction on the phosphor particle surfaces to form a surface barrier layer. In accordance with this invention particles of about 16–20 microns in size of a blue light emitting sulfide type phosphor, ZnS (silver activated) (such as commercially available under the trade designation #1320 by Sylvania Electric Products, Inc.), were moved slowly through furnace F, being heated to a temperature of about 650° C. while passing oxygen through the furnace. An electron retarding unactivated barrier layer of zinc oxide was formed in situ on each of these particles. This zinc oxide layer of semiconductor nature has a thickness and electron retarding properties which are a readily controlled function of the time which these phosphor particles were exposed to the oxygen atmosphere. If desired, the oxygen can be bubbled through water, the use of wet oxygen increases the oxidation rate.

This method provides excellent phosphor particles which have an increased energy threshold, but where, for example, green light-emitting rather than blue fluorescing phosphor particles are to have their energy thresholds increased it is preferable to subject these phosphor particles to a further processing step. This is because the zinc oxide barrier layer, having a somewhat yellowish cast, absorbs emitted light of the green fluorescing phosphors, or otherwise decreases the efficiency of the phosphor. This subsequent step is illustrated in FIGURE 2 where furnace F is diagrammatically shown to include an enclosed tunnel T for maintaining an atmosphere of a sulfur-containing material in vapor phase in intimate contact with particles $P_1$ of the phosphors having a barrier layer of zinc oxide formed thereon. In this example, elemental sulfur S is heated and the vapors thereof are permitted to course through the tunnel T to effect an in situ exchange reaction to convert the barrier layer to a zinc sulfide containing barrier layer. An elevated temperature in the order of about 650° C. is employed in this step. The resulting barrier layer is white and does not significantly affect the color character of blue fluorescing phosphors.

Figure 4:
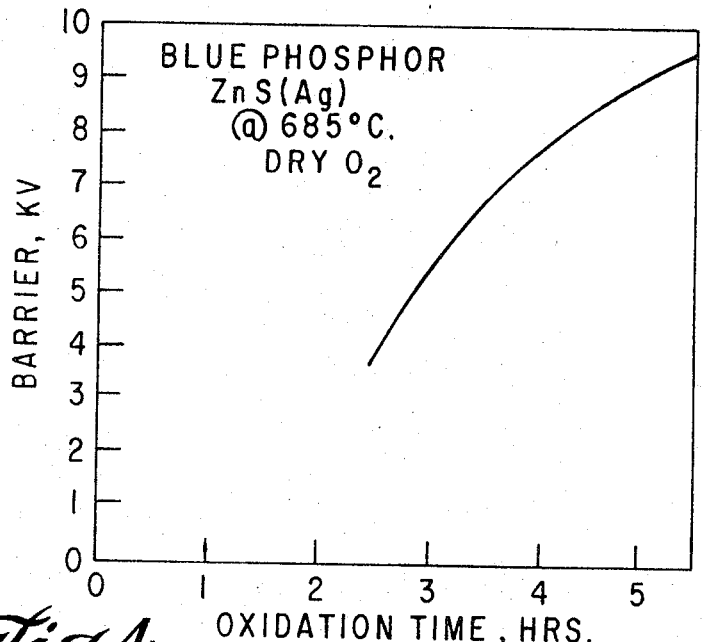

The conveniently controllable methods described above for increasing the electron energization thresholds are more specifically exemplified by the graphs of FIGURES 3 and 4. The increase in energization threshold of phosphors in kilovolts is plotted against hours of reaction time in the furnace F in an atmosphere of oxygen. In FIGURE 3 a green light-emitting phosphor, ZnS-CdS (silver activated), such as that commercially available under the trade designation #1220 from Sylvania Electric Products, Inc., and having a median particle size of 16–20 microns, was moved through furnace F at 2.2 feet/minute while exposed to oxygen introduced at a flow rate of 6 liters/minute, the furnace temperature being maintained at 685° C. Samples were removed periodically, and all samples were individually further exposed to an atmosphere of hydrogen sulfide for two hours at a temperature of 750° C. The zinc oxide barrier layer formed in situ by the first step and converted to a zinc sulfide-containing barrier layer in the hydrogen sulfide treatment is shown to give an easily controlled increase in the energization threshold relative to the untreated material.

The oxygen flow referred to above may be entirely $O_2$, or diluted $O_2$ may be used to control oxidation at elevated temperatures. To this end, the $O_2$ would be diluted with helium, nitrogen or argon. Also, as previously mentioned, either dry $O_2$, or wet $O_2$, bubbled through water, may be used.

The FIGURE 4 graph similarly illustrates the increase in the energization threshold as a function of oxidation time for a blue light-emitting phosphor, as identified previously. In this instance, the oxidation temperature was maintained at 685° C. and the phosphor particles were moved at 2.2 feet/minute.

While temperatures of 685° C., etc., are mentioned above, it will be understood that the oxidation and sulfiding reactions can be carried out at temperatures as low as about 400° C., although the higher temperatures are preferable.

Also, in accordance with this invention viewing screens for color display systems are advantageously made with such treated phosphor particles. For example, green or cyan light-emitting phosphor particles with such in situ formed barrier layers may be applied randomly mixed together with red light-emitting phosphor particles in a thin layer L (approximately one particle thick) to form a viewing screen on a glass face plate G, as illustrated in FIGURE 5. The phosphor particles are quite closely packed so as to be directly subjected sequentially in small domains to a narrow electron scanning beam B.

As each domain includes some of the red light-emitting phosphors and some of the cyan phosphors with an increased electron energization threshold, only the red phosphors will emit light when struck by electrons of a relatively low velocity, while both the red and the cyan light-emitting phosphors will be simultaneously energized by higher energy electrons and thus emit a white or substantially achromatic light.

Random mixtures of two or three types of phosphor particles of different energy threshold barriers may be economically applied to the interior of face plate G by flushing on the glass a thin liquid slurry of a homogeneous or random mixture of the differently responsive phosphor particles suspended in a suitable vehicle, followed by pouring off any excess and evaporation to form a thin dry layer of phosphor particles.

It will be noted that the particles of phosphor having the lowest energy threshold may or may not have a surface barrier layer and that, if desired, the differently responsive phosphor particles may be applied to the face plate in sequentially deposited thin layers, each layer being constituted by one type phosphor.

Ordinarily a continuous conducting film, of evaporated aluminum for example, would be added over the layer of phosphor particles. To this film an accelerating voltage is applied in the operation of the kinescope.

It will be understood that other types of phosphors and atmospheres in addition to those specifically described above are also equivalent for the purposes of this invention. Similarly, the voltage energization levels and increased electron energization thresholds are also exemplary and may be varied widely in accordance with this invention.

In view of the above, it will be seen that the several objects of the invention are achieved and other advantageous results attained.

What is claimed is:

1. A method of increasing the electron energization threshold of phosphor particles comprising:

heating said particles to a first elevated temperature and exposing them to a first gaseous atmosphere of a material which reacts in vapor phase with said particles to effect a first in situ chemical reaction into the surface portions of said particles and heating the resulting phosphor particles to a second elevated temperature and exposing them to a second gaseous atmosphere of a sulfur-containing material which reacts in vapor phase with said surface portions of said particles to effect a second in situ reaction therewith and form a sulfide-containing barrier layer replacing with sulfur atoms substantially all the oxygen atoms in said surface portions of said particles thereby forming an electron retarding layer to trap electrons having energy below a predetermined level.

2. A method as set forth in claim 1 in which said particles are zinc sulfide-containing phosphor particles, said first vapor phase material is oxygen and said first in situ chemical reaction forms a layer of zinc oxide on said particles.

3. A method as set forth in claim 2 in which said first elevated temperature is in the order of at least 400° C.

4. A method as set forth in claim 1 in which the sulfur-containing material is sulfur.

5. A method as set forth in claim 1 in which the sulfur-containing material is hydrogen sulfide.

6. A method as set forth in claim 1 in which said second elevated temperature is in the order of at least 400° C.

References Cited

UNITED STATES PATENTS

| | | | |
|---|---|---|---|
| 2,198,843 | 4/1940 | Ruben | 148—6.24 |
| 2,586,304 | 2/1952 | Coltman et al. | |
| 2,785,098 | 3/1957 | Cunningham et al. | 148—6.24 X |
| 3,062,750 | 11/1962 | Umberger et al. | |

DAVID KLEIN, *Primary Examiner.*

U.S. Cl. X.R.

117—100, 106; 148—6.3; 252—301.6